United States Patent [19]

Wyss

[11] 4,174,125
[45] Nov. 13, 1979

[54] TUBE COUPLING

[76] Inventor: Walter Wyss, Kappel, Switzerland

[21] Appl. No.: 840,962

[22] Filed: Oct. 11, 1977

[51] Int. Cl.$^2$ ............................................. F16L 17/02
[52] U.S. Cl. .................................... 285/110; 285/291;
 285/345; 285/369; 285/383; 285/423
[58] Field of Search ............... 285/110, 383, 111, 423,
 285/369, 379, 345, 230, 231, 291; 277/207 A

[56] References Cited

U.S. PATENT DOCUMENTS

| | | | |
|---|---|---|---|
| 1,924,020 | 8/1933 | Bihet | 285/345 X |
| 1,926,197 | 9/1933 | Durr | 285/110 |
| 2,896,976 | 7/1959 | Wiltse | 285/369 X |
| 3,334,928 | 8/1967 | Schmunk | 285/230 X |
| 3,430,984 | 3/1969 | Wendt | 277/235 X |
| 3,730,562 | 5/1973 | Viazzi | 285/381 X |

FOREIGN PATENT DOCUMENTS 603620  4/1960  Italy ......................................... 285/110

*Primary Examiner*—Dave W. Arola

[57] ABSTRACT

A coupling for sealing two tubes together in end-to-end sealing engagement, comprises an outer tubular sleeve having an interior bore with a plurality of radially extending grooves therein at spaced axial locations and an inner tubular seal arranged within the outer tubular sleeve and having an exterior wall with radially outwardly extending ribs which engage into the respective grooves. The seal has an interior bore with an entrance diameter at each end at least as large as the tubes to be joined or larger so as to have an inwardly tapered entrance. The seal includes a bore wall defining a compression flange with an inwardly, gradually tapering wall adjacent each entrance which tapers inwardly in an axial direction for diameters substantially smaller than the tube. The compression flange also includes an opposite steeply tapering wall which extends in an axial opposite direction to the gradually tapering wall. A lip of less axial length than the flange is spaced axially inwardly of the flange on the seal member and has a minimum diameter substantially the same as the minimum diameter of the flange. The seal member has a first portion between the flange and the lip which accommodates the deflection of the flange and a second portion inwardly of the lip toward the center of the seal which accommodates a deflection of the lip. The flange is sized so that it will be deflected by the tubular member up to a point at which it engages the rear part of the lip which is also deflected into an undercut part of the seal member which has a diameter less than the exterior diameter of the tube to be joined. The seal also advantageously includes a centering flange at the center thereof which has a diameter much smaller than the diameters of the tubes to be joined so that they do not come into engagement.

10 Claims, 7 Drawing Figures

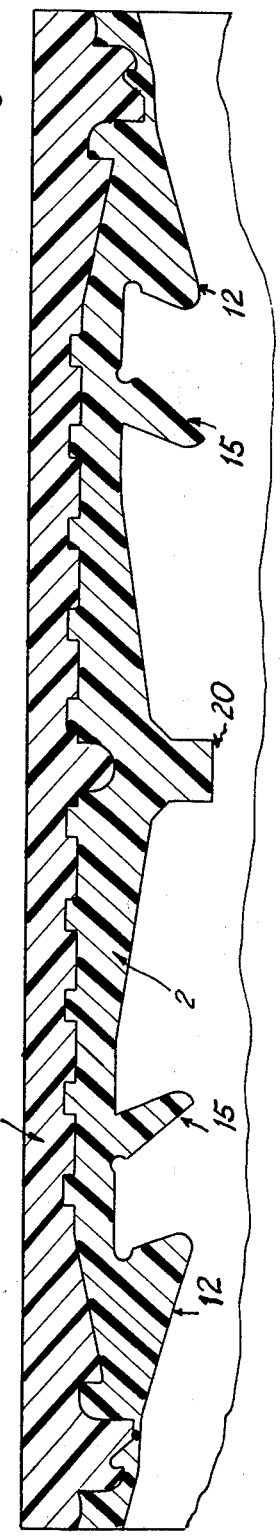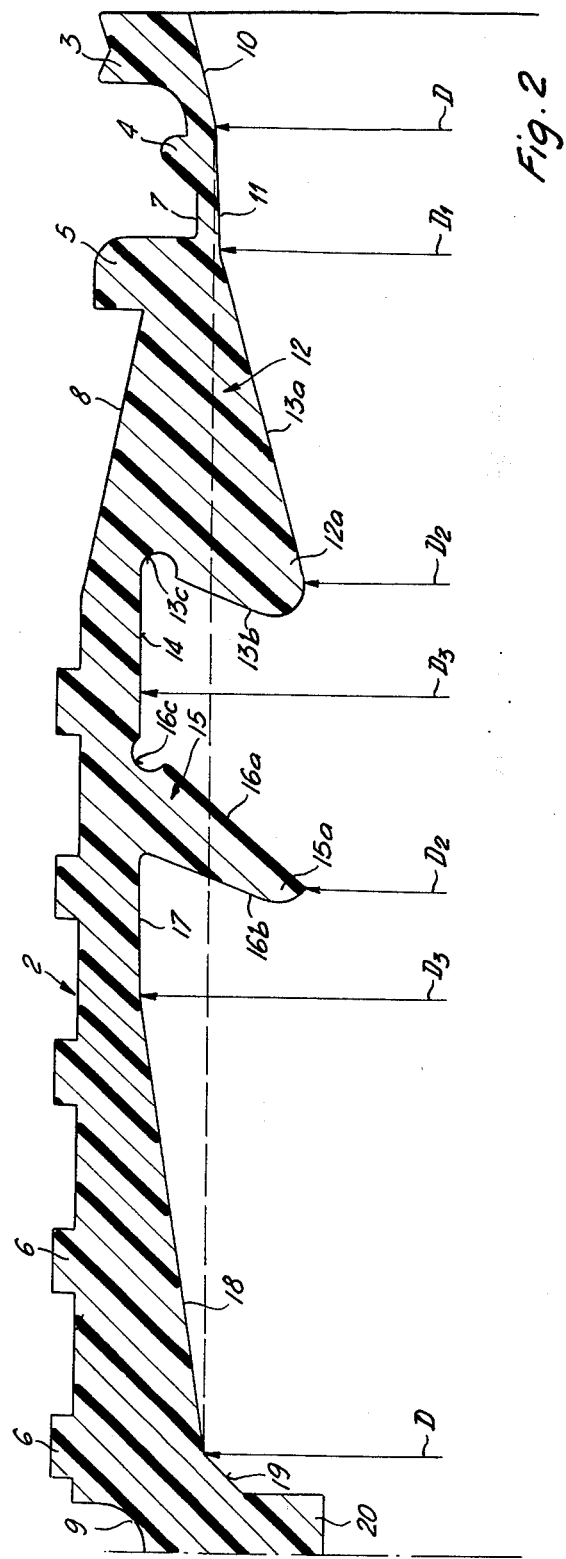

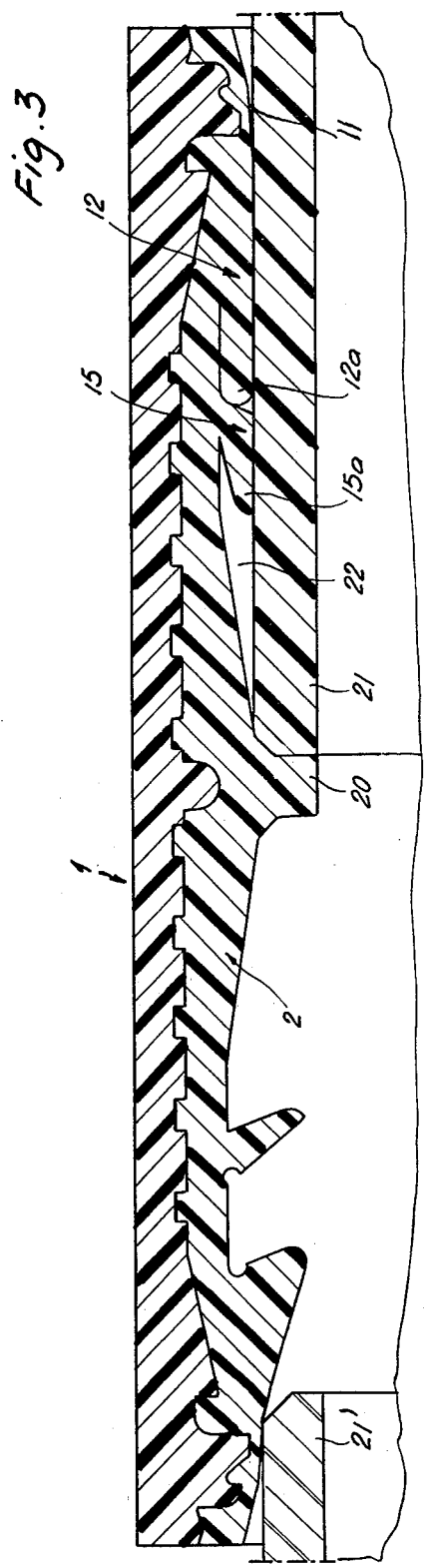

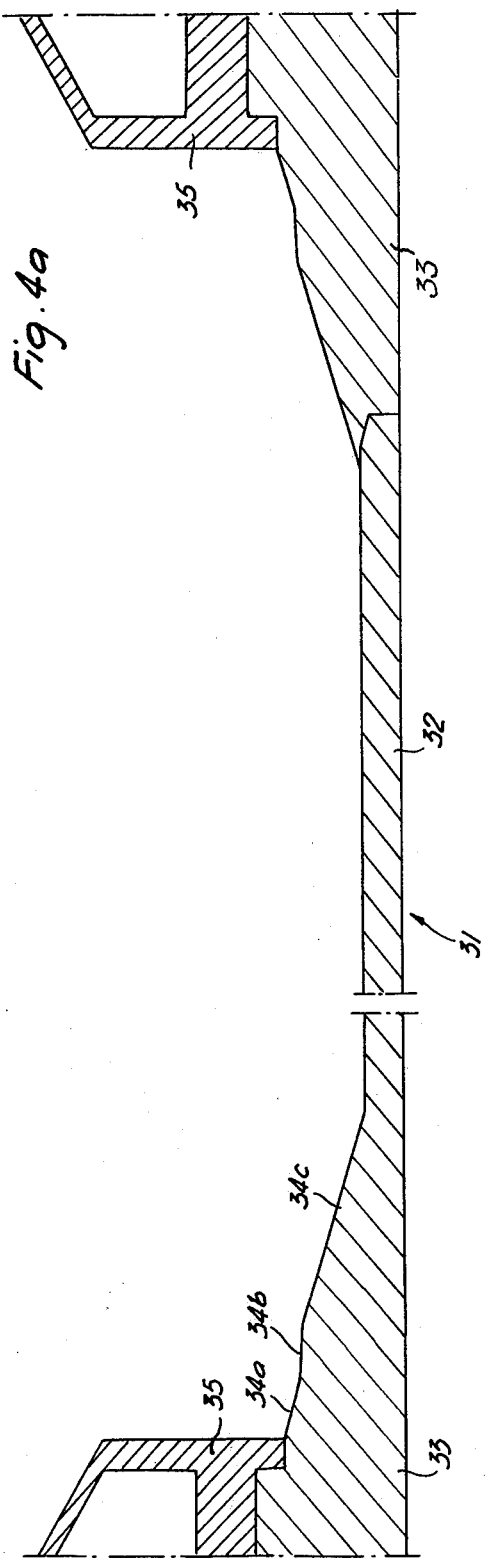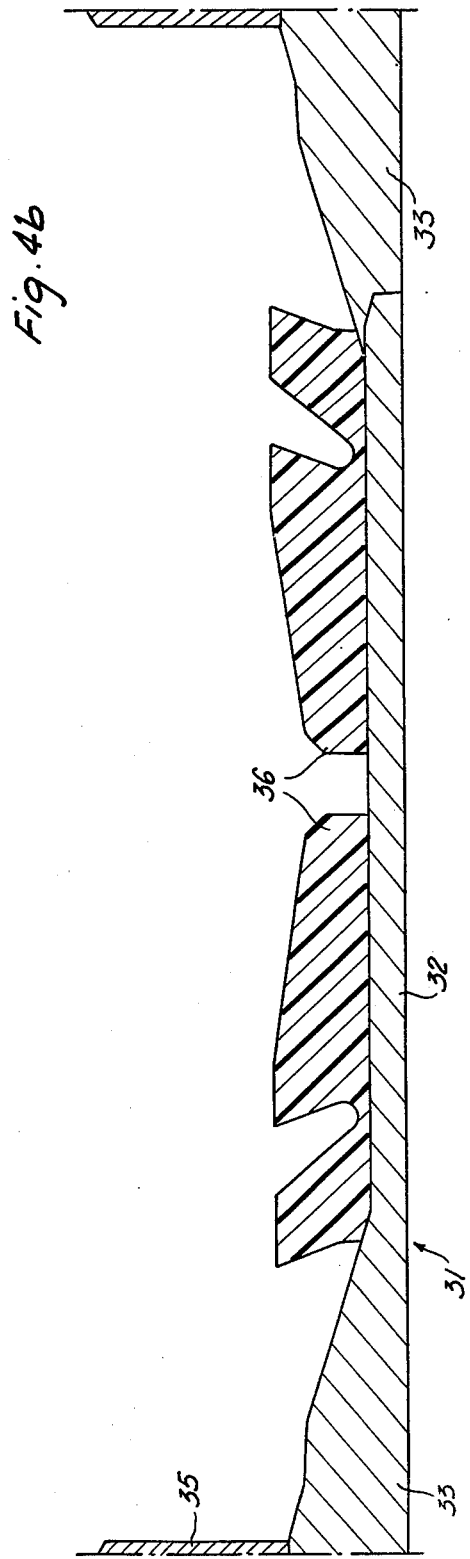

TUBE COUPLING

FIELD AND BACKGROUND OF THE INVENTION

This invention relates in general to tube construction and manufacture and, in particular, to a new and useful tube coupling and to a method of manufacturing the same.

DESCRIPTION OF THE PRIOR ART

Tube couplings usually comprise a tubular sleeve receiving the end portions of the two tubes to be connected to each other, and at least one sealing ring securing a tight bond between these two elements and providing a seal in the outward and inward directions. In most instances, these sealing rings are either inserted in retaining grooves of the sleeve or they are rolled into such a groove during the introduction of the tube end portions into the sleeve. In other cases, the portions contacting the tube of the sealing rings are frequently shaped as lips or the like which, during the introduction of the tube into the sleeve, can deflect into suitable recesses of the sleeve. Experience has shown, however, that under the pressures which are usually needed for introducing the tubes into the sleeve, the conventional sealing rings are frequently torn out of their anchoring grooves or, particularly if they have the shape of lips pointing toward the tube end, they are turned inside out under the internal pressures occurring in the pressure line and, thereby, become leaky. Attempts have already been made to solve this problem by providing a plurality of sealing rings spaced from and following each other. Such a design, however, largely resulted not only in making the introduction of the tubes into the sleeve more difficult, but also resulted in a correspondingly increased number of possible disturbance points.

SUMMARY OF THE INVENTION

The present invention is directed to a tube coupling including a seal between the tube and the tubular sleeve, in which the sealing element is prevented, both during the introduction of the tube into the sleeve and due to any internal pressure, from being displaced or deflected, or from becoming leaky.

To this end, in accordance with the invention, the tubular sleeve of the coupling, intended for receiving the two tube end portions and having a symmetrical shape relative to its radial median plane, is lined with a single-piece, continuous, sealing element which extends, at least approximately, over the entire length of the sleeve and is anchored in retaining grooves of the sleeve which are distributed over the entire length of the sealing element. The sealing element is provided at either end of the sleeve with a radially inwardly projecting compression flange having an inside diameter corresponding approximately, but at most, to the diameter of the tube and decreasing in the inward direction. The axially inward end of the flange is formed by an undercut steep face which blends into a sealing element portion which is enlarged relative to the diameter of the tube and the length and diameter of which are chosen so that with the tube inserted and because of the radial compression and axial deformation of the flange, the steep face of the flange is displaced into a position in which it extends along the enlarged portion of the sealing element.

The axially continuous sealing element, which is anchored in the sleeve at several locations, is secured against displacement in the sleeve (be it during the introduction of the tubes or due to the effect of an internal pressure) and ensures, owing to the flange which becomes axially deformed under the radial compression, a completely satisfactory sealing of the gap between the tube and the sealing element. Also, due to the continuous structure of the sealing element, no points to be further sealed are left in the zone within the two extremities of the seal, between the sleeve and the sealing element.

The particularly advantageous method of manufacturing the inventive tube coupling, which is also included in the subject matter of the present invention, provides that a backing ring of rubber-elastic material is fitted on a cylindrical metal form having an outside surface which is shaped approximately as a negative of the associated portions of the inside contour of the sealing element. The sealing element, made of rubber-elastic material, is engaged over the backing ring, so that the inside surface of the sealing element engages the outside surface of the backing ring. A tubular sleeve is built up on the sealing element and it is provided on its outside with anchoring profiles extending over the length thereof so that the sleeve firmly adheres to the sealing element and forms corresponding matching profiles. The tubular sleeve lined with the sealing element firmly adhereing thereto is then removed from the form.

Due to the backing ring provided between the form cylinder and the sealing element, the same form can be used for differently profiled sealing elements of the same tube diameter. The sleeve is advantageously built up by winding tapes or bands around it which are glass fiber-reinforced and plastic-impregnated. The pull of the band produced during the winding operation ensures a completely satisfactory bond between the anchoring profiles of the sealing element and the conforming sleeve. In addition, in contrast to steel sleeves for example, a relatively resilient sleeve is produced making it possible to provide a tube coupling which, independent of the material of the tubes, is always more elastic than the tubes to be connected to each other. This permits the coupling to adapt to compression and deformation strains in the coupling zones, which are largely unavoidable in pipeline constructions.

Accordingly, it is an object of the invention to provide a coupling for sealing two tubes together in end-to-end sealing engagement which comprises an outer tubular sleeve having an interior bore with a plurality of radially extending grooves therein at spaced axial locations with an inner tubular seal arranged within the outer tubular sleeve and having an exterior wall with radially outwardly extending ribs which engage in the respective grooves of the sleeve, the seal also having an interior bore with an entrance diameter at each end at least as large as the tubes to be joined and including a bore wall defining a compression flange with an inwardly gradually tapering wall adjacent each entrance tapering inwardly to a diameter substantially smaller than the tube and also having an interior steeply tapering wall extending in an opposite direction to the gradually tapering wall, the bore of the seal also including a lip of less axial length than the flange spaced axially inwardly of the flange and having a minimum diameter substantially the same as the minimum diameter of the flange, the seal having a first portion between the flange and the lip and a second portion between the lip and the center of the seal of a diameter smaller than the tubes which are to be connected, whereby, the flange is deflectable by insertion of the tube so that its steeply tapering wall becomes disposed along the first portion up to the lip and its gradually tapering portion engages the tube in sealing engagement and the lip is deflectable into said second portion.

Another object of the invention is to provide a method of forming an outer sleeve for combining with a seal member of a coupling which comprises positioning an elastic backing ring over a cylindrical metal form which has an outside surface shaped approximately as a negative of the associated portions of an inside wall profile of a sealing element, engaging a sealing element of rubber-elastic material over the backing ring so that the inside surface of the sealing element engages the outside surface of the backing ring, and adding reinforced plastic material over the sealing element to form a backing ring which will have an interior surface complementary to, and engageable with, the sealing element, with the sealing element exterior wall and the backing ring internal wall being formed with anchoring profiles over the length thereof so that the backing ring and the sealing element are firmly adhered together and thereafter removing the backing ring together with the sealing element from the form.

A further object of the invention is to provide a coupling for sealing two tubes together which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which preferred embodiments of the invention are illustrated.

BRIEF DESCRIPTION OF THE DRAWINGS

In the Drawings:

FIG. 1 is an axial sectional view of a coupling constructed in accordance with the invention;

FIG. 2 is an enlarged axial sectional view of half of the sealing element and the coupling shown in FIG. 1;

FIG. 3 is a sectional view, similar to FIG. 1, showing insertion of the tubes to be coupled into the coupling of the invention;

FIG. 4a is an axial sectional view of an apparatus for forming the sleeve to a ring in accordance with the method of the invention; and FIGS. 4b, 4c and 4d are views, similar to FIG. 1, showing the various steps of applying the mold parts and the seal member to the ring.

DESCRIPTION OF THE PREFERRED EMBODIMENTS

Figure 4C:
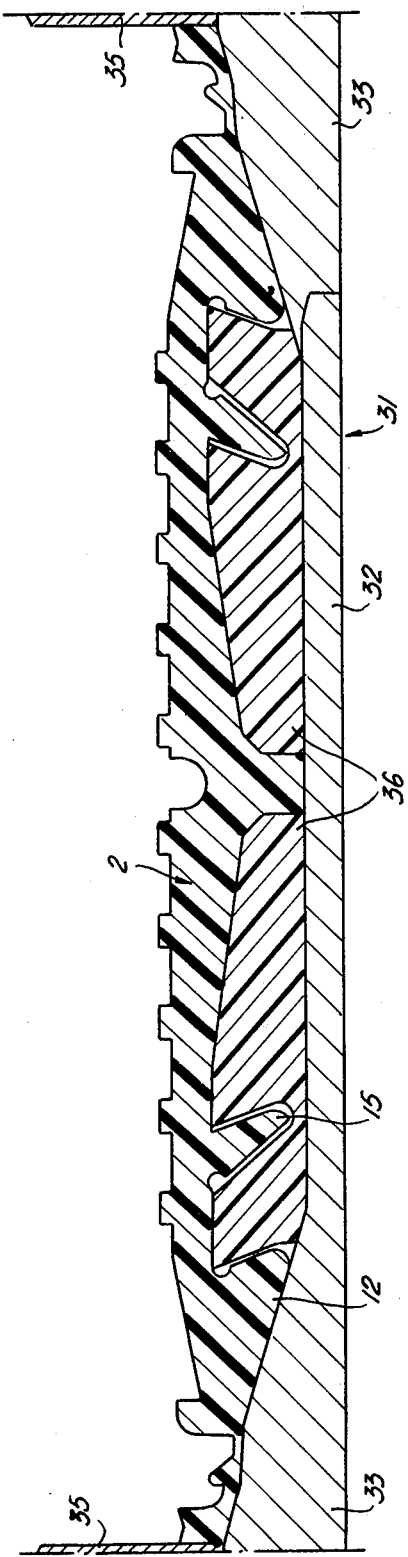
Figure 4D:
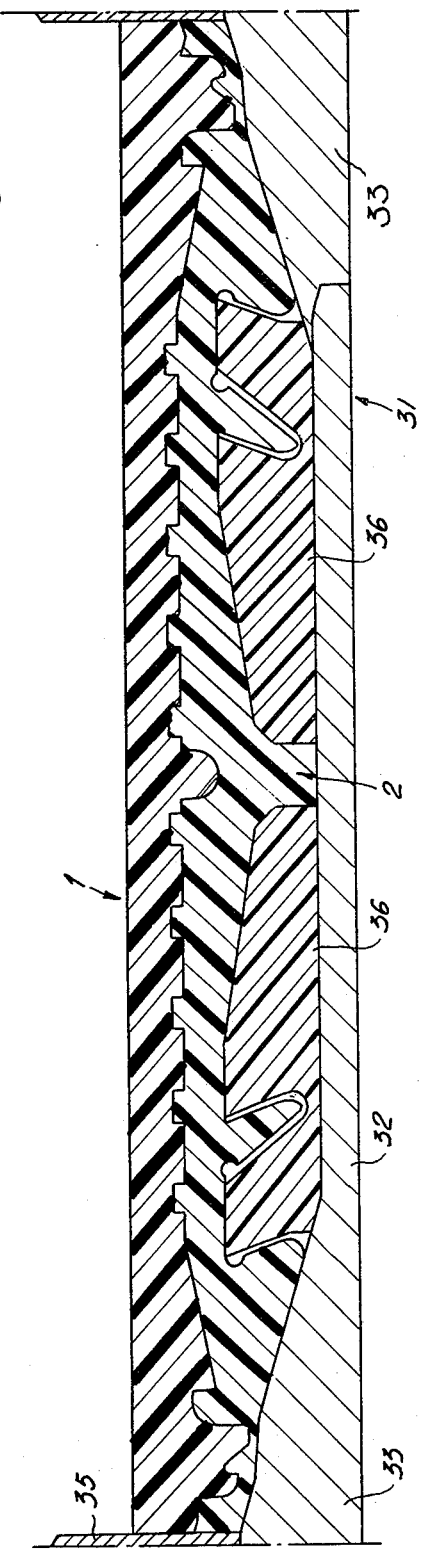

Referring to the drawings in particular, the invention embodied therein in FIG. 1, comprises a coupling which includes a sleeve or ring part 1 of glass fiber reinforced plastic and a sealing element, generally designated 2, arranged within the sleeve 1 and being made of a rubber-elastic material.

The coupling shown in FIGS. 1 to 3 comprises a cylindrical sleeve 1 made of a glass fiber-reinforced plastic, which is lined with a sealing element 2 made of a rubber-elastic material and has a shape which is symmetrically profiled relative to the radial median plane of the element. For anchoring the tubular sealing element 2 to sleeve 1, the sealing element is provided on either side with an end flange 3 which engages a frontal recess in the rim of the sleeve, and it is further provided with outer annular ribs 4, 5 and 6 intermediate the two end flanges 3, which engage corresponding annular grooves of the sleeve and will be described in more detail hereinafter.

As shown in the drawings, flange 3 is formed by a relatively wide annular groove 7 of element 2 in the middle of which a projecting, relatively low, annular rib 4 is provided and is bounded, at the inward side, by an annular rib 5 which is followed by a relatively long groove 8 shallowing out to a cylindrical wall portion of element 2. The cylindrical wall portions of the two halves of the sleeve making up element 2 and which are provided with outwardly projecting annular ribs 6 of a rectangular cross-section which are equidistantly spaced from each other, are separated from each other by a relatively deep annular groove 9, as shown in FIG. 3. In this connection, it is to be noted that the boundary faces of annular groove 7 extend radially and and that axially inwardly of rib 4, groove 7 is deeper than at the opposite side of rib 4, while the greatest depth of groove 8, adjacent rib 5, is shallower than the depth of groove 7 in the axially outward portion thereof.

While the axially outward face of annular groove 4 extends substantially in the radial direction, the axially inward face of this rib tapers, at an angle of approximately 40°, to the cylindrical bottom of the adjacent portion of groove 7. The axially inward face of annular rib 5 extends radially, while the bottom of adjacent groove 8 extends at an angle of approximately 10° to 15°, and preferably 12°, to shallow out to the cylindrical outside surface of sealing element 2.

The inside surface of sealing element 2, which is also symmetrically profiled relative to its radial median plane is provided, starting from the free end of end flange 3, with a flaring entry portion 10 extending axially up to close before rib 4 and converging, at an angle of approximately 15°, to the diameter D of the tube, which is followed by a slide portion 11 slightly tapering to a diameter $D_1$ which is only slightly smaller than tube diameter D and terminates shortly beyond groove 7. Portion 11 is followed by a compression flange 12 having a tapering flange 13a converging at an angle of approximately 15° to a diameter $D_2$.

An undercut end face or concave mold 13c in the zone of the axially inward end of groove 8 blends into a cylindrical recess portion or first portion 14 having a diameter $D_3$ which is substantially larger than tube diameter D. The inclined face 13b of flange 12 which extends at an angle of approximately 70° relative to the axial direction, is set off from portion 14 by the concave mold 13c. The axial length of portion 14 corresponds approximately to the height of face 13b of flange 12. Cylindrical portion 14 is followed by a lip 15 whose axially outward face 16a, separated from portion 14 by a concave mold 16c, is considerably steeper than the corresponding face 13a of flange 12 and extends at an angle of approximately 45° to 55° relative to the axial direction, while its steeper, undercut face 16b extends at an angle of approximately 65° to 75°.

While the axial length of the base of flange 12 is greater than the radial height thereof, the axial length of the base of lip 15 is smaller than the radial height thereof, and the smallest inside diameter of lip 15 is equal to the corresponding diameter $D_2$ of flange 12. As shown in the drawing, lip 15 is followed by a cylindrical portion or second portion 17 having a diameter which is equal to diameter $D_3$ of portion 14, and this portion 17 is followed by a flat tapering portion 18 which is relatively long and has an end diameter which is equal to the tube diameter D, the angle of convergence being approximately 8° to 10°.

In the middle of the length of sealing element 2, thus in the zone of outside groove 9, a separating flange 20 projecting down beyond the tube diameter is provided, which is connected to the flat tapering portion 18 through a relatively steep taper 19.

Tubes 21 and 21' which are to be connected to each other (FIG. 3) are introduced into the interior of the sleeve 1 and the sealing element 2 so that the beveled end face of tube 21 first contacts the portion 11 of sealing element 2 which, due to groove 7, is relatively thin-walled and tapers only slightly below tube diameter D. End flange 3 resting against sleeve 1 securely prevents an axial deflection of the end portion of sealing element 2 inwardly.

On the other hand, due to the fact that its diameter grows smaller relative to the tube diameter, portion 11 is subject to a slight prestressing which increases in the inward direction, so that, in cooperation with the anchoring rib 4 associated with this portion 11, an axially outwardly directed force which may act on this portion (for example, due to the internal pressure in the tube) becomes effective as a blocking force increasing this bias and, thereby, preventing a deflection of this portion toward the outside.

During the further introduction of tube 21, flange 12 is relatively strongly compressed in the radial direction and is also deformed in the axially inward direction, so that it is deflected into the annular space formed along portion 14 due to the enlarged diameter in this zone, whereupon, the initially steep face 13b of the flange is displaced into a position in which it extends relatively flatly along the cylindrical portion 14.

Because of its steepness and the relative remoteness of its base from the tube diameter, lip 15 is deflected axially inwardly during the further introduction of the tube and the dimensions of portions 12, 14, 15 and 17 are chosen so that, in practice, the axially inwardly deflected portion 12a of flange 12 applies to lip 15, while at the axially inward side of lip 15, between the outer circumference of tube 21 butting against sealing element 2 at the inward end of portion 18 and portions 17, 18, a pocket 22 remains.

In case pressure caused by the internal pressure in the tube builds up in pocket 22, lip 15 is loaded by this pressure in the axially outward direction, whereby, the sealing effect at the tube is increased. In the axially outward direction, the axially inwardly deflected lip portion 15a cannot yield, since this is prevented by the already deflected portion 12a of flange 12 bracing the lip 15. Flange 12, which is under strong compression, cannot yield in any direction, since there is no space left. In this respect, it is to be noted that the prestress of portion 11 and the strong reduction of the cross-sectional area of the sealing element between flange 12 and portion 11 counteracts a deformation caused by internal pressure of flange 12 into portion 11.

On the other hand, in order to enable the relatively big mass of flange 12, particularly during the introduction of the tube to deform freely or adapt to the remaining space between the sleeve and the tube without producing undesirably high shearing forces in the flange by a too strong anchoring of the base of the flange to the sleeve, no anchoring rib 6 is provided between cicumferential rib 5 located at the outward end of flange 12 and the first rib 6 located in the zone of portion 14. Groove 8, however, with its bottom conically extending from rib 5 and shallowing out toward the cylindrical outer surface, ensures that any pressure from the interior acting on the deformed flange produces a further flange compression increasing in the outward direction (wedge effect) and thereby intensifies the blockage of the flange against yielding in that direction.

The coupling described, which comprises a sealing element which due to its outer and inner contour is prevented from being displaced both as a whole or partially under any axial pressure load which occurs and which does not permit a contact between a medium flowing through the tubes and the sleeve at any point within the length of the coupling, ensures an absolute tightness in both directions toward the outside and toward the inside due to lip 15. This also applies to a coupling for tubes which are under high internal pressure. Incidentally, with any pressure, even low internal pressure, lip 15 must not be omitted.

Even though it has been proven to be particularly advantageous to have a sealing element 2 extending up to the end of sleeve 1 and, at the same time, to have it anchored by means of outward end flanges 3, portions 10 and 11, including ribs 3 and 4 might also be omitted. In such a case, the entry of the sleeve bore is to be designed as a flaring portion, corresponding approximately to portion 10, followed by a cylindrical portion having a diameter slightly larger than the tube diameter, and the inside diameter at the outward end of the compression flange, which then forms the end portion of the sealing element, should be slightly larger than the outside diameter of the tube.

Although it is possible to provide the inventive coupling with a metal sleeve in which the sealing element is anchored by means of undercut grooves or ribs, a sleeve made of a glass fiber reinforced plastic material has proven to be particularly advantageous, especially if the sleeve is employed for connecting large size plastic tubes (for example, for hydraulic mains, sewage or ventilating ducts).

A particularly advantageous method of manufacturing such a coupling is explained in the following by way of example and with reference to FIGS. 4a to 4d.

A tubular steel form 31 is used for the manufacturing process. This form (FIG. 4a) comprises a cylindrical wall 32 having an outside diameter which is smaller than the outside diameter of the tubes to be connected by means of the coupling to be manufactured, while the axial length of this wall is slightly shorter than the length of the coupling to be manufactured. The extremities of this wall 32 are formed at either side by end flanges 33 comprising inwardly inclined tapering surfaces 34a, 34b and 34c. The axial length, inclination and diameter of these tapering surfaces 34a, 34b and 34c correspond to those of portions 10, 11 and 13a of sealing element 2 of the coupling to be manufactured.

In the axially outward direction, tapering surfaces 34a are bounded by radial front walls 35 which are supported on end flanges 33. A backing ring 36 made of a rubber-elastic material is slipped on wall 32 of form 31 (FIG. 4b). The outer circumferential surface and the end faces of backing ring 36 which, in this example is designed as a two-part ring, have a countour which with respect to position and radial height is conformable to portions 13b, 14, 15, 17, 18, 19 and 20 of the sealing element. This contour is a negative of the inside profile of the mentioned portions of sealing element 2 which is now appropriately engaged over backing ring 36 (FIG. 4c). Thereby, portions 20, 10, 11 and 12 of sealing element 2 engage wall 32 and tapering surfaces 34a, 34b and 34c, respectively, of form 31, while the other portions of the sealing element engage radially in or on the corresponding recesses or elevations of backing ring 36. This ensures that during the following operational steps, sealing element 2 maintains its basic cylindrical shape.

Thereupon, the material which serves to build up the coupling sleeve 1 is applied to the form core thus prepared (FIG. 4c), between end wall 35 of the form and up to the desired radial height. A plastic with a suitable reinforcement is used for this purpose. For example, a textile carrier band and a glass fiber roving may be simultaneously passed through an impregnating vessel containing a liquid plastic and then conjointly conveyed to the outer circumference of sealing element 2, while the form is rotated about its axis, so that sealing element 2, forming the outside layer of the form core, is served with the plastic-impregnated, glass fiber-reinforced band.

Advantageously, the form driven for rotation pulls the winding material from the delivery spools and through the impregnating vessel. The tension produced thereby in the winding material results in a snug fit of this material on the profiled anchoring contour of sealing element 2. This, supported by the shrinkage of the winding material following the curing of the plastic, further results in an absolutely tight, firm bond between the sealing element and the sleeve. The form is then opened, for example, by removing one of the end flanges 33 which is detachably secured to wall 32, whereupon, the finished tubular coupling along with backing ring 36 can be drawn off form wall 32 and backing ring 36 can be removed.

In order to prevent a harmful influence of the solvent on the sealing element made of natural or synthetic rubber if certain plastics (for example, styrene polyester) are used, prior to the winding operation, the sealing element may be provided with a suitable protective coating. A styrene-free polyester of an epoxy resin may also be used.

Depending on the material, structure and reinforcement of the sleeve, the rigidity of the sleeve may be provided as desired, within certain limits. This makes it possible, for example, to make the coupling more elastic than the tubes to be connected to each other, so that the coupling becomes capable of absorbing the axial thrusts and deformations at the coupling points, which are frequently unavoidable in pipeline constructions, without being damaged or becoming leaky. The sealing element 2, as described, also supports such thrusts without becoming leaky, due to the conic shape of the inward portion 18 bearing against the front end of the tubes, while central rib 20 prevents a direct contact of the front faces of the tubes, in any case.

It is possible, of course, to also use the coupling having a sleeve of plastic for connecting steel or concrete tubes to each other, and also to provide the described sealing element with a sleeve of concrete, eternit (asbestos-cement), or other suitable material.

While specific embodiments of the invention have been shown and described in detail to illustrate the application of the principles of the invention, it will be understood that the invention may be embodied otherwise without departing from such principles.

What is claimed is:

1. A tube coupling for coupling the end portions of two tubes together, comprising a rigid, circumferentially continuous; outer tubular sleeve and an inner tubular seal arranged within said sleeve, said tubular sleeve intended for receiving the respective ones of the two tube end portions, said tubular sleeve having a symmetrical shape relative to its radial median plane and having a bore with a boundary wall defining a plurality of retaining grooves distributed along its length, said seal being a continuous single part which extends substantially over the entire length of said sleeve and is anchored in said retaining grooves, said seal having a seal bore bounding wall being provided adjacent an end of said sleeve with a compression flange, the maximum diameter of said compression flange corresponding at most to the exterior diameter of the tube to be joined, the said diameter of said compression flange decreasing in an axial inward direction to form one face of said compression flange which is adapted to contact the tube, the axially inward end of said compression flange having an undercut steep face, said seal member having a recess portion of greater diameter than said tube to be joined approximately equal in axial length to the length of said steep face and forming a receiving space for the steep face of said compression flange, said compression flange having an axial length greater than the radial height thereof and being adapted to be deflected axially and compressed radially, by insertion of the tube, into the receiving space to project sufficiently to tightly engage and seal with the tube.

2. A tube coupling according to claim 1, wherein said seal includes an outwardly flaring entrance end at each end, said flaring portion having a wall thickness many times smaller than that of said flange.

3. A tube coupling according to claim 1, wherein said seal has an entry portion flared inwardly and which is provided with an annular thickened flange portion on its exterior which bears against said sleeve.

4. A tube coupling according to claim 1, including an anchoring rib formed on the exterior wall of said seal adjacent the entrance end of said flange, said sleeve having a receiving groove into which said anchoring rib extends, said seal including on its interior a tapering slide portion and an outwardly flaring entry portion and including an exterior flange around said outwardly flaring entry portion and a circumferential rib overlying said slide portion, said sleeve having receiving grooves for said exterior flange and said annular rib into which they engage.

5. A tube coupling according to claim 4, wherein said seal member includes a groove defined between said anchoring rib and said circumferential rib and overlying the axially outward end of said compression flange.

6. A coupling for sealing two tubes together in end-to-end sealing engagement, comprising a rigid, circumferentially continuous outer tubular sleeve having an interior bore with a plurality of radially extending grooves therein at spaced axial locations, an inner tubular seal arranged within said outer tubular sleeve and having an exterior wall with radially outwardly extending ribs engaged in the respective grooves of said sleeve, said seal having an interior bore with an entrance diameter at each end at least as large as that of the tubes to be joined and including a bore wall defining a compression flange with an inwardly gradually tapering wall side adjacent each entrance starting at a diameter at most equal to that of the tubes to be joined and tapering inwardly to a diameter substantially smaller than the tubes to be joined, said compression flange also being defined by an interior steeply tapering wall extending in an opposite direction to said gradually tapering wall, said flange being greater in axial length than the radial height of said steeply tapering wall, said bore of said seal including a lip of less radial length than said flange spaced axially inwardly of said compression flange and having an inner diameter substantially the same as the inner diameter of said flange, said seal having a first portion between said flange and said lip and a second portion between said lip and the center of said seal of a diameter larger than the diameter of the tubes to be joined, said first portion having an axial length approximately equal to the length of said steeply tapered wall, said flange being deflectable axially and compressible radially by insertion of said tube so that its steeply tapering wall becomes disposed along said first portion up to said lip and its gradually tapered portion engages the tube in sealing engagement, said lip being deflectible into said second portion by engagement of the tube in the seal, said exterior wall of said seal including an outside long groove approximately overlaying and coextensive with said compression flange which is free of radially outwardly extending ribs tapering radially outwardly from approximately the area of said start of said compression flange to the area of said first portion, thereby causing an increasing compression in an outward direction of said compression flange and reducing shearing forces in said compression flange when the tube is inserted.

7. A coupling according to claim 6, wherein said second portion is followed by a tapering portion tapering inwardly to a smaller diameter, said seal having a central internal rib at the center thereof adjacent the inwardly tapering portion.

8. A coupling according to claim 6, wherein the axially outer face of said lip is steeper than said gradually tapered portion of said flange, said lip having an axially inward face which is steeper than the axially outer face of said flange but approximately of the same steepness as said axial inner face of said flange.

9. A coupling according to claim 6, wherein said seal member has an undercut concave cylindrical surface adjacent the axial inner face of said flange and the axial outer face of said lip.

10. A coupling according to claim 6, wherein the space between said lip and said flange and the radially inwardly extending extent of said flange is chosen so that with the compression of said flange by the tube to be inserted, the flange portion which is deformed in an axial inward direction projects into said first portion and provides a support for said lip.

* * * * *

UNITED STATES PATENT AND TRADEMARK OFFICE
CERTIFICATE OF CORRECTION

PATENT NO. : 4,174,125

DATED : November 13, 1979

INVENTOR(S) : Walter Wyss

It is certified that error appears in the above-identified patent and that said Letters Patent is hereby corrected as shown below:

On the title page, after Item /75/ insert

--- /73/ Assignee: Hobas Engineering AG, Switzerland ---.

On the title page, after Item /22/ insert

---/30/ Foreign application Priority Data

Switzerland     12935/76     Oct. 13, 1976 ---.

Signed and Sealed this

Fifth Day of April 1983

[SEAL]

Attest:

GERALD J. MOSSINGHOFF

Attesting Officer     Commissioner of Patents and Trademarks